(12) United States Patent
Houser et al.

(10) Patent No.: US 12,208,802 B2
(45) Date of Patent: Jan. 28, 2025

(54) METHOD FOR COLD START LUBE EVACUATION

(71) Applicant: Dana Heavy Vehicle Systems Group, LLC, Maumee, OH (US)

(72) Inventors: Jordan M. Houser, Sylvania, OH (US); James Allen, Perrysburg, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 296 days.

(21) Appl. No.: 17/659,811

(22) Filed: Apr. 19, 2022

(65) Prior Publication Data

US 2023/0331234 A1    Oct. 19, 2023

(51) Int. Cl.
| | | |
|---|---|---|
| *B60W 30/194* | (2012.01) | |
| *B60K 17/02* | (2006.01) | |
| *B60L 3/12* | (2006.01) | |
| *B60L 15/20* | (2006.01) | |
| *B60W 10/02* | (2006.01) | |
| *B60W 10/08* | (2006.01) | |
| *B60W 10/10* | (2012.01) | |
| *B60W 10/18* | (2012.01) | |
| *F16H 57/04* | (2010.01) | |
| *F16H 59/72* | (2006.01) | |
| *F16H 61/16* | (2006.01) | |
| *B60K 1/00* | (2006.01) | |

(52) U.S. Cl.
CPC ........... *B60W 30/194* (2013.01); *B60K 17/02* (2013.01); *B60L 3/12* (2013.01); *B60L 15/20* (2013.01); *B60W 10/02* (2013.01); *B60W 10/08* (2013.01); *B60W 10/10* (2013.01); *B60W 10/18* (2013.01); *F16H 57/0457* (2013.01); *F16H 59/72* (2013.01); *F16H 61/16* (2013.01); *B60K 2001/001* (2013.01); *B60W 2510/107* (2013.01); *B60W 2710/021* (2013.01); *B60W 2710/081* (2013.01); *B60W 2710/10* (2013.01); *B60W 2710/18* (2013.01); *F16H 2061/168* (2013.01)

(58) Field of Classification Search
CPC ...... B60W 10/02; B60W 10/08; B60W 10/10; B60W 10/18; B60W 30/194; B60W 2510/107; B60W 2710/021; B60W 2710/081; B60W 2710/10; B60W 2710/18; B60K 17/02; B60K 2001/001; B60L 3/12; B60L 15/20; F16H 57/0457; F16H 59/72; F16H 61/16; F16H 2061/168
See application file for complete search history.

(56) References Cited

U.S. PATENT DOCUMENTS 8,604,738 B2    12/2013  Takizawa
9,283,851 B2 *  3/2016   Kanda .................... B60L 15/20
(Continued)

FOREIGN PATENT DOCUMENTS

WO    2018203798 A1    11/2018

*Primary Examiner* — Edwin A Young
(74) *Attorney, Agent, or Firm* — McCoy Russell LLP

(57) ABSTRACT

Methods and systems for evacuating lubricant from an area of an axle are described. The lubricant may be evacuated away from one or more clutches during low temperatures so that a clutch may be engaged while having to displace less lubricant to engage the clutch. In one example, an electric machine may be rotated to evacuate lubricant away from the clutch.

18 Claims, 5 Drawing Sheets

(56) References Cited

U.S. PATENT DOCUMENTS

| | | | |
|---|---|---|---|
| 10,862,365 B2 * | 12/2020 | Yamaguchi | H02K 5/203 |
| 2011/0095717 A1 * | 4/2011 | Takizawa | H02P 29/62 |
| | | | 318/473 |
| 2017/0097086 A1 * | 4/2017 | Ono | B60K 6/405 |
| 2017/0175612 A1 | 6/2017 | Tokozakura et al. | |

* cited by examiner

METHOD FOR COLD START LUBE EVACUATION

TECHNICAL FIELD

The present disclosure relates to a method for operating an electrified axle of a vehicle. The method may be applied to an electric vehicle that includes an electrified axle that includes a gear set.

BACKGROUND AND SUMMARY

A vehicle may include an axle that has an electric machine that is directly coupled to the axle. The electric machine may provide propulsive effort to the vehicle so that the vehicle may travel to a desired destination. The axle may also include a gear set. The electric machine may be coupled to the gear set so that the electric machine may generate a desired wheel torque and so that the electric machine may operate in a desired operating region. The gear set may include a shifting actuator and one or more clutches. The one or more clutches may be at least partially submerged in lubricant and the lubricant may prevent the one more clutches from engaging when the lubricant temperature is less than a threshold due to the increase in viscosity of the lubricant at lower temperatures. For example, at low temperatures, lubrication may have sufficient resistance to prevent an actuator from closing a dog clutch. In particular, the lubricant may resist being displaced from between a first half of a dog clutch that rotates with a shaft and a second half of the dog clutch that rotates with a gear that may be selectively coupled to the shaft via the dog clutch. By preventing the clutch from engaging, the lubricant may prevent a vehicle from being able to drive away from a parking position.

The inventors herein have recognized the above-mentioned issues and have developed a vehicle system, comprising: an axle including a set of gears and an electric machine; and a controller including instructions stored in non-transitory memory that when executed cause the controller to rotate the electric machine for a predetermined amount of time in response to a request to cold start the axle and a temperature being less than a threshold temperature.

By rotating an electric machine of an axle when a temperature of a lubricant is less than a threshold temperature, it may be possible to provide the technical result of dispersing lubricant within an electrically powered axle so that a dog clutch may be engaged to a gear. Rotating the electric machine allows the electric machine to rotate one or more gears that are partially submerged in lubricant before the electric machine beings to rotate. The rotating gears splash and distribute the lubricant to other areas of the axle so that the dog clutch is no longer submerged in lubricant, thereby allowing the dog clutch to close.

The present description may provide several advantages. In particular, the approach may improve operation of an electrified axle during cold operating conditions. Further, the approach may reduce a possibility of clutch actuator degradation. In addition, the approach may be implemented without increasing system cost.

It is to be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
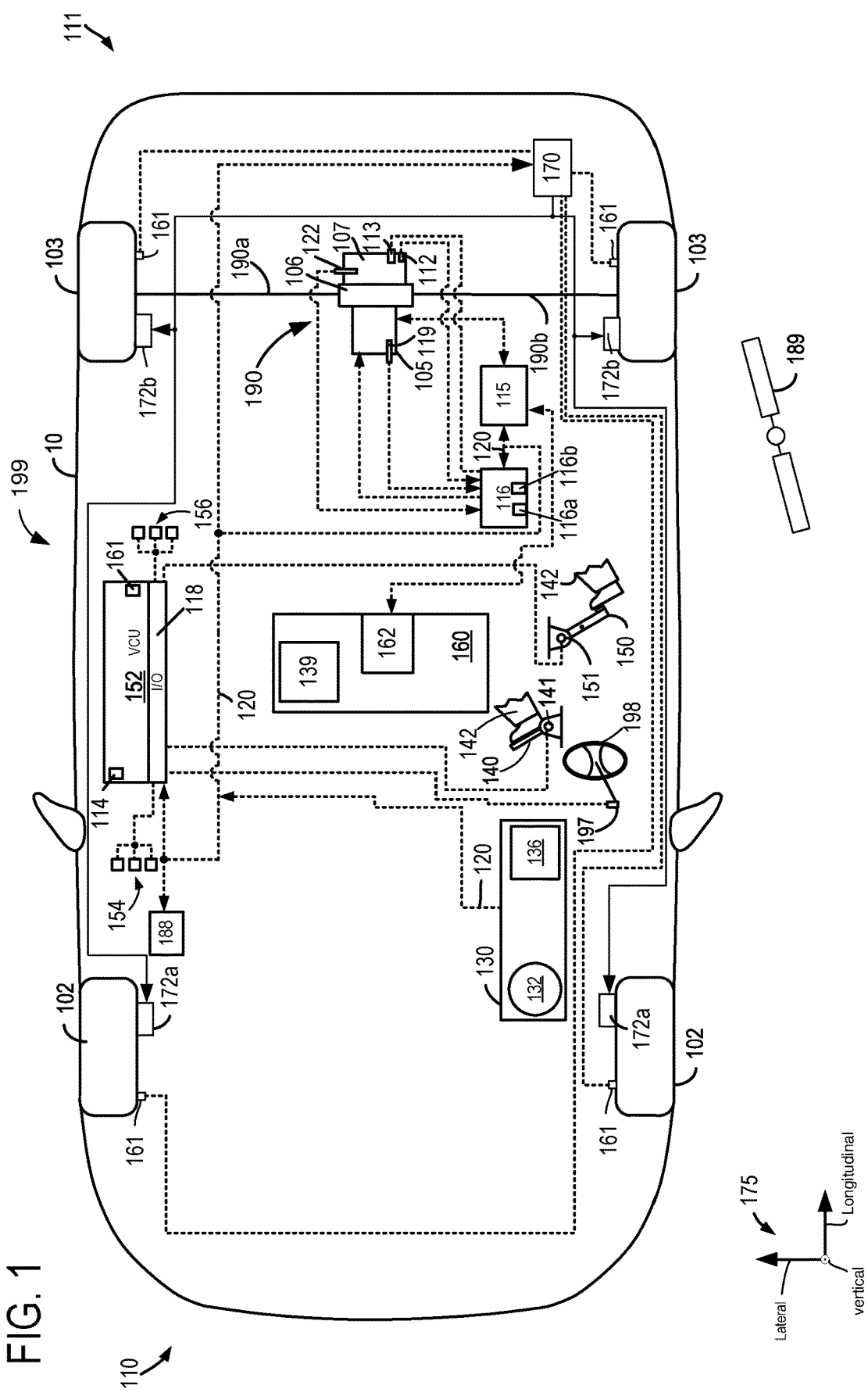
FIG. 1 is an illustration of an example vehicle that includes an electrified axle.
Figure 2:
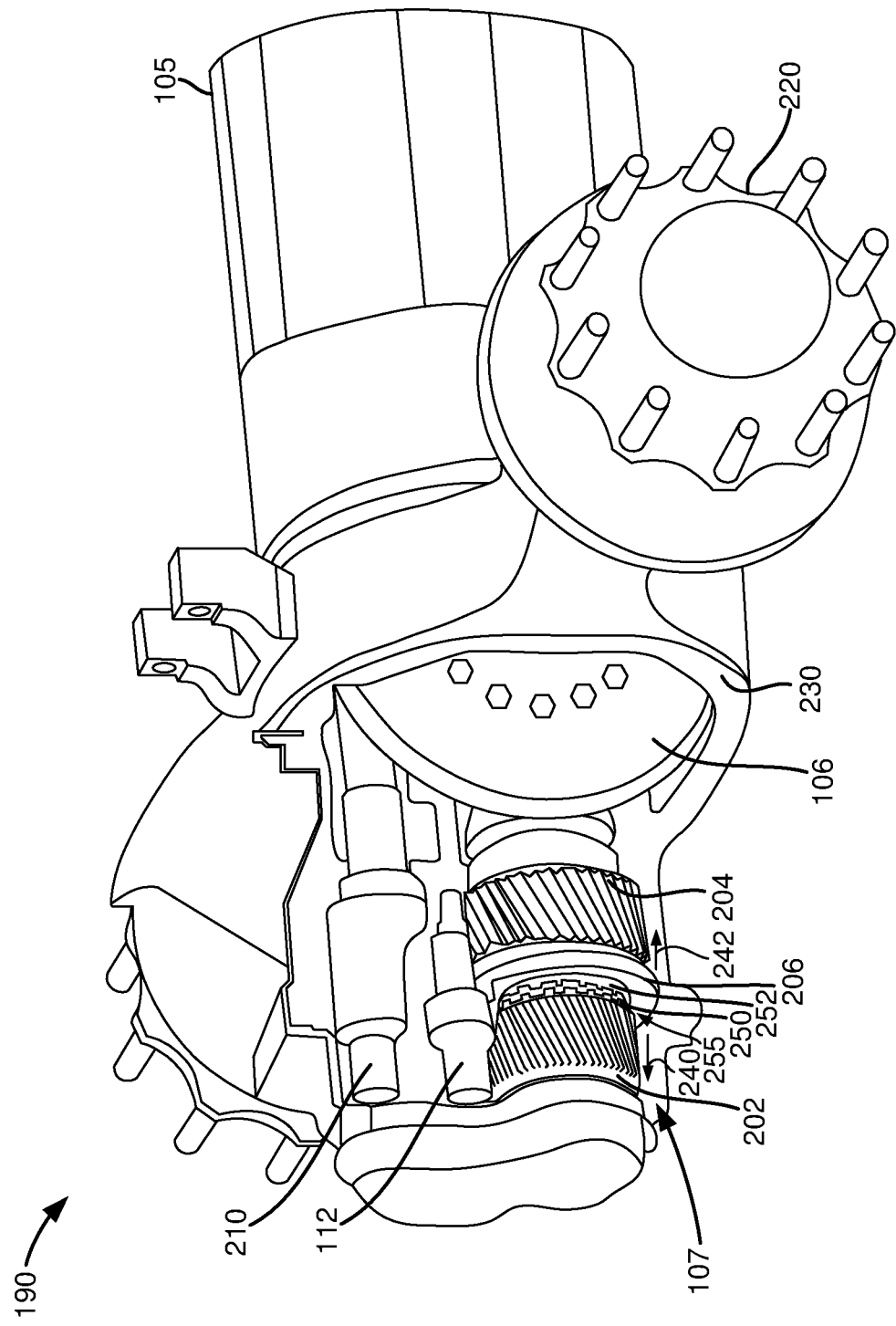
FIG. 2 shows a cut-away perspective view of an example electrified axle.
Figure 3:
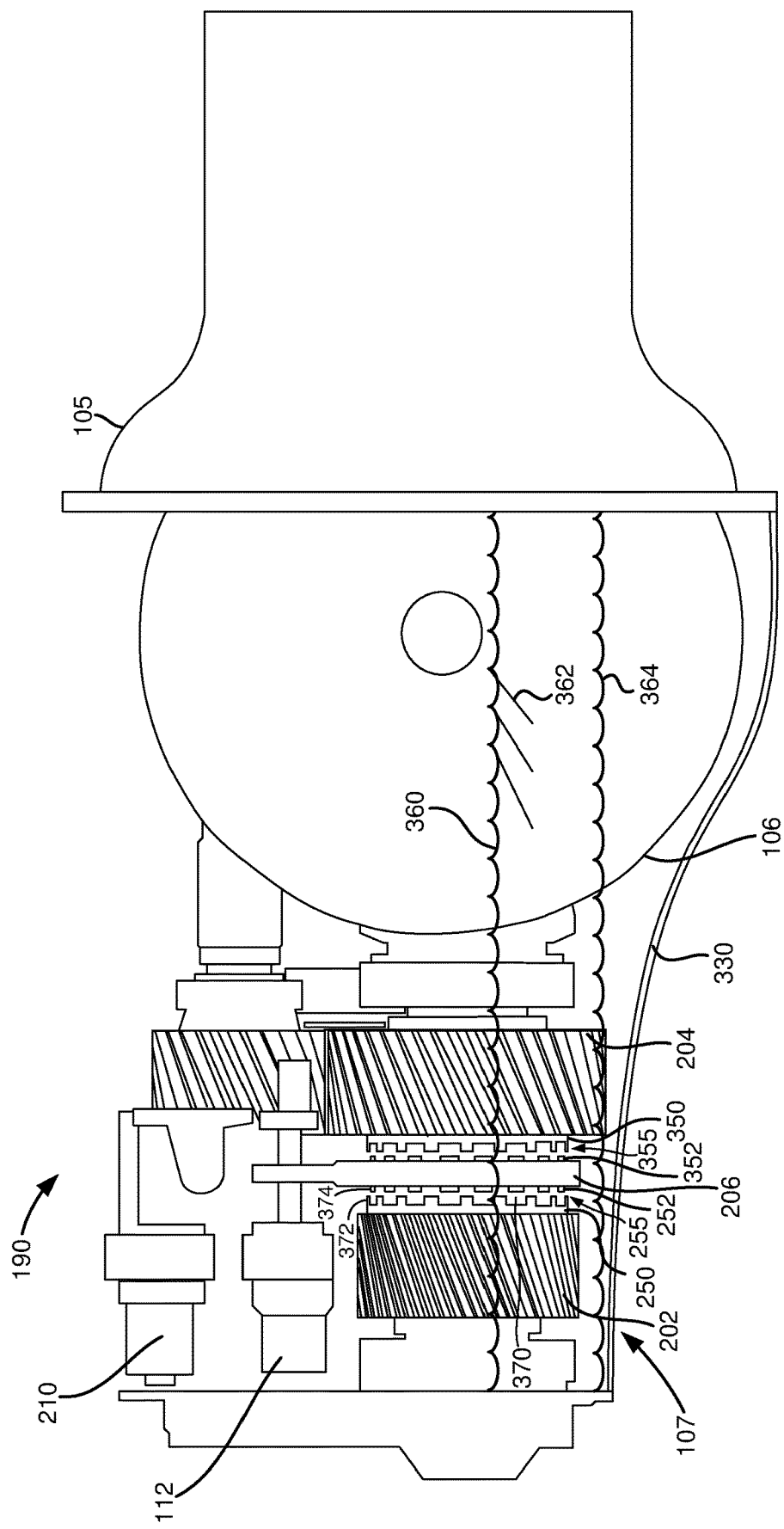
FIG. 3 shows a cut-away longitudinal view of an example electrified axle.
Figure 4:
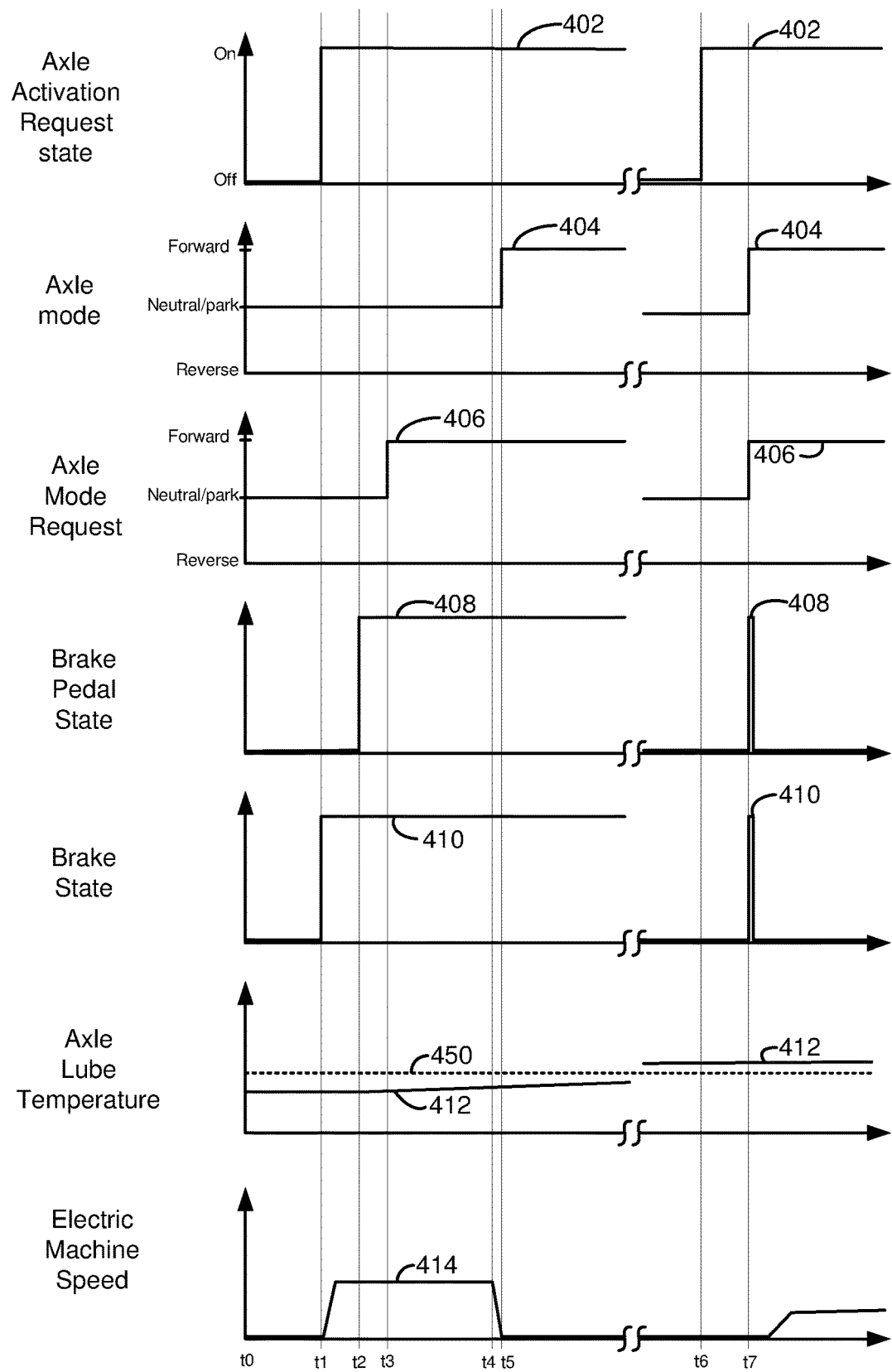
FIG. 4 shows an operating sequence for an electrified axle.

A method and system for operating an electrified axle is described. The method and system may selectively rotate the electric machine in response to a temperature of a lubricant so that a clutch may be engaged from a disengaged state. In one example, the clutch is a dog clutch and the dog clutch may be engaged after rotating the electric machine causes the lubricant to disperse other areas within the electrified axle. An example vehicle that includes an electrified axle is shown in FIG. 1. Views of the example electrified axle and its cold lubricant level are shown in FIGS. 2 and 3. An example operating sequence for the electrified axle is shown in FIG. 4. The sequence of FIG. 4 may be provided by the method of FIG. 5.

FIG. 1 illustrates an example vehicle propulsion system 199 for vehicle 10. A front end 110 of vehicle 10 is indicated and a rear end 111 of vehicle 10 is also indicated. Vehicle 10 travels in a forward direction when front end leads movement of vehicle 10. Vehicle 10 travels in a reverse direction when rear end leads movement of vehicle 10. Vehicle propulsion system 199 includes a propulsion source 105 (e.g., an electric machine), but in other examples two or more propulsion sources may be provided. In one example, propulsion source 105 may be an electric machine that operates as a motor or generator. The propulsion source 105 is fastened to the electrified axle 190. In FIG. 1 mechanical connections between the various components are illustrated as solid lines, whereas electrical connections between various components are illustrated as dashed lines.

Vehicle propulsion system 199 includes an electrified axle 190 (e.g., an axle that includes an integrated electric machine that provides propulsive effort for the vehicle). Electrified axle 190 may include two half shafts, including a first or right haft shaft 190a and a second or left half shaft 190b. Vehicle 10 further includes front wheels 102 and rear wheels 103.

The electrified axle 190 may be an integrated axle that includes differential gears 106, gear set 107, and propulsion source 105. Electrified axle 190 may include a first speed sensor 119 for sensing a speed of propulsion source 105, a second speed sensor 122 for sensing a speed of an output shaft (not shown), a first clutch actuator 112, and a clutch position sensor 113. Electric power inverter 115 is electrically coupled to propulsion source 105. An axle control unit 116 is electrically coupled to sensors and actuators of electrified axle 190.

Propulsion source 105 may transfer mechanical power to or receive mechanical power from gear set 107. As such, gear set 107 may be a multi-speed gear set that may shift between gears when commanded via axle control unit 116.

Axle control unit 116 includes a processor 116a and memory 116b. Memory 116b may include read only memory, random access memory, and keep alive memory. Gear set 107 may transfer mechanical power to or receive mechanical power from differential gears 106. Differential gears 106 may transfer mechanical power to or receive mechanical power from rear wheels 103 via right half shaft 190a and left half shaft 190b. Propulsion source 105 may consume alternating current (AC) electrical power provided via electric power inverter 115. Alternatively, propulsion source 105b may provide AC electrical power to electric power inverter 115. Electric power inverter 115 may be provided with high voltage direct current (DC) power from electric energy storage device 160 (e.g., a traction battery or a traction capacitor). Electric power inverter 115 may convert the DC electrical power from electric energy storage device 160 into AC electrical power for propulsion source 105. Alternatively, electric power inverter 115 may be provided with AC power from propulsion source 105. Electric power inverter 115 may convert the AC electrical power from propulsion source 105 into DC power to store in electric energy storage device 160.

Electric energy storage device 160 may periodically receive electrical energy from a power source such as a stationary power grid (not shown) residing external to the vehicle (e.g., not part of the vehicle). As a non-limiting example, vehicle propulsion system 199 may be configured as a plug-in electric vehicle (EV), whereby electrical energy may be supplied to electric energy storage device 160 via the power grid (not shown).

Electric energy storage device 160 may include an electric energy storage device controller 139 and an electrical power distribution box 162. Electric energy storage device controller 139 may provide charge balancing between energy storage element (e.g., battery cells) and communication with other vehicle controllers (e.g., vehicle control unit 152).

Vehicle 10 may include a vehicle control unit (VCU) controller 152 that may communicate with electric power inverter 115, axle control unit 116, friction or foundation brake controller 170, global positioning system (GPS) 188, and dashboard 130 and components included therein via controller area network (CAN) 120. VCU 152 includes memory 114, which may include read-only memory (ROM or non-transitory memory) and random access memory (RAM). VCU also includes a digital processor or central processing unit (CPU) 161, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not limited to lateral accelerometers, longitudinal accelerometers, yaw rate sensors, inclinometers, temperature sensors, electric energy storage device voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and brake pedal position sensor 151. Actuators may include but are not limited to inverters, transmission controllers, display devices, human/machine interfaces, friction braking systems, and electric energy storage device controller described herein.

Driver demand pedal position sensor 141 is shown coupled to driver demand pedal 140 for determining a degree of application of driver demand pedal 140 by human 142. Brake pedal position sensor 151 is shown coupled to brake pedal 150 for determining a degree of application of brake pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system may also include a dashboard 130 that an operator of the vehicle may interact with. Dashboard 130 may include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to activate and/or deactivate operation of the vehicle driveline (e.g., propulsion source 105) based on an operator input. Further, an operator may request an axle mode (e.g., park, reverse, neutral, drive) via the operator interface. Various examples of the operator interface 136 may include interfaces that require a physical apparatus, such as a key, that may be inserted into the operator interface 136 to activate the electrified axle 190 and propulsion source 105 and to turn on the vehicle 10 or may be removed to shut down the electrified axle and propulsion source 105 to turn off vehicle 10. Electrified axle 190 and propulsion source 105 may be activated via supplying electric power to propulsion source 105 and/or electric power inverter 115. Electrified axle 190 and electric machine may be deactivated by ceasing to supply electric power to electrified axle 190 and propulsion source 105 and/or electric power inverter 115. Still other examples may additionally or optionally use a start/stop button that is manually pressed by the operator to start or shut down the electrified axle 190 and propulsion source 105 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle controller 152 to activate the electrified axle 190 including an inverter and electric machine. Spatial orientation of vehicle 10 is indicated via axes 175.

Vehicle 10 is also shown with a foundation or friction brake controller 170. Friction brake controller 170 may selectively apply and release friction brakes 172 via allowing hydraulic fluid to flow to friction brakes 172. Friction brakes 172 may be applied and released so as to avoid locking of friction brake 172 to front wheels 102 and rear wheels 103. Wheel position or speed sensors 161 may provide wheel speed data to friction brake controller 170. Vehicle propulsion system 199 may provide torque to rear wheels 103 to propel vehicle 10.

A human or autonomous driver may request a driver demand wheel torque, or alternatively a driver demand wheel power, via applying driver demand pedal 140 or via supplying a driver demand wheel torque/power request to vehicle controller 152. Vehicle controller 152 may then demand a torque or power from propulsion source 105 via commanding axle control unit 116. Axle control unit 116 may command electric power inverter 115 to deliver the driver demand wheel torque/power via electrified axle 190 and propulsion source 105. Electric power inverter 115 may convert DC electrical power from electric energy storage device 160 into AC power and supply the AC power to propulsion source 105. Propulsion source 105 rotates and transfers torque/power to gear set 107. Gear set 107 may supply torque from propulsion source 105 to differential gears 106, and differential gears 106 transfer torque from propulsion source 105 to rear wheels 103 via half shafts 190a and 190b.

During conditions when the driver demand pedal is fully released, vehicle controller 152 may request a small negative or regenerative braking power to gradually slow vehicle 10 when a speed of vehicle 10 is greater than a threshold speed. The amount of regenerative braking power requested may be a function of driver demand pedal position, electric energy storage device state of charge (SOC), vehicle speed, and other conditions. If the driver demand pedal 140 is fully released and vehicle speed is less than a threshold speed, vehicle controller 152 may request a small amount of positive torque/power from propulsion source 105, which may be referred to as creep torque or power. The creep torque or power may allow vehicle 10 to remain stationary when vehicle 10 is on a positive grade.

The human or autonomous driver may also request a negative or regenerative driver demand braking torque, or alternatively a driver demand braking power, via applying brake pedal 150 or via supplying a driver demand braking power request to vehicle control unit 152. Vehicle controller 152 may request that a first portion of the driver demanded braking power be generated via electrified axle 190 and propulsion source 105 via commanding axle control unit 116. Additionally, vehicle controller 152 may request that a portion of the driver demanded braking power be provided via friction brakes 172 via commanding friction brake controller 170 to provide a second portion of the driver requested braking power.

After vehicle controller 152 determines the braking power request, vehicle controller 152 may command axle control unit 116 to deliver the portion of the driver demand braking power allocated to electrified axle 190. Electric power inverter 115 may convert AC electrical power generated by propulsion source 105 into DC power for storage in electric energy storage device 160. Propulsion source 105 may convert the vehicle's kinetic energy into AC power.

Axle control unit 116 includes predetermined transmission gear shift schedules whereby fixed ratio gears of gear set 107 may be selectively engaged and disengaged. Shift schedules stored in axle control unit 116 may select gear shift points or conditions as a function of driver demand wheel torque and vehicle speed. Axle control unit 116 may selectively engage and disengage one or more dog clutches shown in FIGS. 2 and 3 to shift gears and change a gear ratio between propulsion source 105 and rear wheels 103.

Referring now to FIG. 2, a perspective cut-away view of electrified axle 190 is shown. In this view, part of axle housing 230 has been cut-away to show gear set 107. In one example, gear set 107 is a four ratio or four speed gear set. However, in other examples, gear set 107 may include a different number of gear ratios, two for example. Gear set 107 may be shifted via a first clutch actuator 112, which is configured to engage and disengage a first gear 202 and a second gear 204. First clutch actuator 112 may engage the first gear 202 via moving shifting fork 206 in the direction that is indicated by arrow 240. First clutch actuator 112 may also engage the second gear 204 via moving shifting fork 206 in the direction that is indicated by arrow 242. In FIG. 2, shifting fork 206 is positioned between the first gear 202 and the second gear 204 in a neutral position where neither the first gear 202 nor the second gear 204 is engaged. Shifting fork 206 may engage the first gear 202 via moving a first half 252 of a first dog clutch 255 in the direction indicated by arrow 240 so that first half 252 engages second half 250 of first dog clutch 255. The first half 252 of dog of first dog clutch 255 rotates at a speed of a shaft (not shown) that is directly coupled to propulsion source 105. First half 252 of first dog clutch 255 may be coupled to the shaft via splines (not shown). The second half 250 of first dog clutch 255 is coupled to first gear 202 such that second half 250 of first dog clutch 255 rotates at a same speed as first gear 202. First gear 202 may not rotate at a same speed as the shaft that first half 252 of first dog clutch 255 is coupled to via the spline when first dog clutch 255 is disengaged. First gear 202 does rotate at a same speed as the shaft that first half 252 of first dog clutch 255 is coupled to via the spline when first dog clutch 255 is engaged.

First clutch actuator 112 may also selectively engage second gear 204 via moving in the direction that is indicated by arrow 242. Similar to first dog clutch 255, a second dog clutch (now shown) may engage the first gear 202 via moving a first half (not shown) of the second dog clutch in the direction indicated by arrow 242 so that a first half engages a second half (not shown) of the second dog clutch. The first half of dog of the second dog clutch rotates at a speed of the shaft (not shown) that is directly coupled to propulsion source 105. The second half of the second dog clutch may be coupled to the shaft via splines (not shown). The second half of the second dog clutch is coupled to second gear 204 such that second half of second dog clutch rotates at a same speed as second gear 204. Second gear 204 may not rotate at a same speed as the shaft that first half of the second dog clutch is coupled to via the spline when first dog clutch 255 is disengaged. Second gear 204 does rotate at a same speed as the shaft that the second half of second dog clutch is coupled to via the spline when the second dog clutch is engaged. Propulsion source 105 is rotationally coupled to first gear 202, differential gears 106, wheel hub 220, and wheel 103 of FIG. 1 when first dog clutch 255 is engaged. Similarly, propulsion source 105 is rotationally coupled to second gear 204, differential gears 106, wheel hub 220, and wheel 103 of FIG. 1 when second dog clutch 355 is engaged.

Second clutch actuator 210 may selectively engage a third gear and a fourth gear in a way that is similar to the way the first clutch actuator 112 selectively engages and disengages the first gear 202 and the second gear 204.

Referring now to FIG. 3, a cut-away section of electrified axle 190 in the longitudinal direction of vehicle 10 is shown. FIG. 3 shows the components of electrified axle 190 from a different perspective than is shown in FIG. 2. In addition, this view shows example levels of transmission lubricant.

Shifting fork 206 is shown in a center position where first gear 202 is not engaged by first dog clutch 255 and where and second gear 204 is not engaged by second dog clutch 355. First half 252 of first dog clutch 255 is separated from second half 250 of first dog clutch 255 such that there is a gap 370 between teeth 374 of the first half 352 of first dog clutch 255 and teeth 372 of the second half 250 of first dog clutch 255. It may be desirable to reduce or eliminate the gap before torque is transferred between the first half and the second half of the first dog clutch 255. Likewise, first half 352 of second dog clutch 355 is separated from second half 350 of second dog clutch 355 while shifting fork 206 is in the center or neutral position.

Lubricant is shown at lubricant level 360 which represents a lubricant level for cold starting electrified axle 190 (e.g., applying power to electrical components of electrified axle and beginning to rotate the electrified axle when a lubricant temperature of the electrified axel is less than a threshold temperature and after the propulsion source has not rotated for a threshold amount of time (e.g., one hour). First dog clutch 255 and second dog clutch 355 are shown partially submerged when lubricant is at the lubricant level 360. The electrified axle may be cold started when the propulsion source 105 has not rotated for a predetermined amount of time (e.g., 20 minutes) and lubricant temperature is less than a threshold temperature. When lubricant 362 is cold, it may not be possible to close the first dog clutch 255 and the second dog clutch 355 when lubricant 362 is at lubricant level 360 because the lubricant 362 resists being pushed from gap 370 and other similar gaps. In other words, first clutch actuator 112 may have insufficient force to close gap 370 and similar gaps to close the first dog clutch 255 when the lubricant temperature is less than a threshold level and when the lubricant level is at a cold start level.

In order to increase a possibility of closing dog clutches and shifting during cold conditions, propulsion source 105 may rotate first gear 202 and second gear 204 so that a level of lubricant 362 is reduced to a second lubricant level 364, where the second lubricant level 364 is less than the lubricant level 360. By reducing the level of lubricant 362, less lubricant 362 may have to be evacuated from gap 370 and similar gaps so that first clutch actuator 112 may close first dog clutch 255. Additionally, reducing the level of lubricant 362 may allow first clutch actuator 112 to close second dog clutch 355 if commanded to do so. Second clutch actuator 210 may be able to close third and fourth dog clutches (not shown) when the third and fourth dog clutches are not submerged in lubricant 362.

Thus, the system of FIGS. 1-3 provides for a vehicle system, comprising: an axle including a set of gears and an electric machine; and a controller including instructions stored in non-transitory memory that when executed cause the controller to rotate the electric machine for a predetermined amount of time in response to a request to cold start the axle and a temperature being less than a threshold temperature. In a first example, the vehicle system further comprises a lubricant within the axle, and where the temperature is a temperature of the lubricant. In a second example that may include the first example, the vehicle system includes wherein cold starting the axle includes activating the electric machine from a deactivated state. In a third example that may include one or both of the first and second examples, the vehicle system further comprises additional instructions that cause the controller to inhibit shifting of the set of gears while the electric machine is rotating for the predetermined amount of time. In a fourth example that may include one or more of the first through third examples, the vehicle system includes wherein the electric machine is rotated at a predetermined speed. In a fifth example that may include one or more of the first through fourth examples, the vehicle system further comprises additional instructions that cause the controller to stop rotation of the electric machine after rotating the electric machine for the predetermined amount of time. In a sixth example that may include one or more of the first through fourth examples, the vehicle system further comprises additional instructions that cause the controller to shift the gearbox to a neutral state in response to a request to shut down the axle. In a seventh example that may include one or more of the first through sixth examples, the vehicle system further comprises one or more shift actuators and one or more dog clutches.

Referring now to FIG. 4, a prophetic vehicle operating sequence is shown. The operating sequence of FIG. 4 may be provided via the system of FIGS. 1-3 in cooperation with the methods of FIG. 5. The vertical lines at times t0-t7 represent times of interest during the operating sequence. The plots are time aligned. The double SS lines represent a break in time and the duration of the break in time may be long or short.

The first plot from the top of FIG. 4 is a plot of a state of an axle activation request versus time. The vertical axis represents the axle activation request state and the axle activation request state is asserted when trace 402 is at a higher level that is near the vertical axis arrow. The axle activation request state is not asserted when trace 402 is at a lower level that is near the horizontal axis. The horizontal axis represents time and time increases from the left side of the plot to the right side of the plot. Trace 402 represents the state of the axle activation request. The axle activation request may be asserted via a vehicle operator pressing a button to activate a vehicle, a device (e.g., a key fob) being within a threshold distance of a vehicle, or a remote (e.g., radio frequency) start request from a device that is external to the vehicle.

The second plot from the top of FIG. 4 is a plot of an electrified axle operating mode versus time. The vertical axis represents the electrified axle operating mode (the present mode in which the electrified axle is operating) and the electrified axle operating mode may be forward (a forward gear is engaged), neutral/park (no gear is engaged), or reverse (a reverse gear is engaged). The horizontal axis represents time and time increases from the left side of the plot to the right side of the plot. Trace 404 represents the electrified axle operating mode.

The third plot from the top of FIG. 4 is a plot of an electrified axle mode request versus time. The vertical axis represents the requested electrified axle mode (the mode that the electrified axle is requested to operate in) and the requested electrified axle operating mode may be forward, neutral/park, or reverse (a reverse gear is engaged). The horizontal axis represents time and time increases from the left side of the plot to the right side of the plot. Trace 406 represents the requested electrified axle operating mode.

The fourth plot from the top of FIG. 4 is a plot of a brake pedal operating state versus time. The vertical axis represents the brake pedal operating state and the brake pedal is applied when trace 408 is at a higher level that is near the vertical axis arrow. The brake pedal is not applied when trace 408 is at a lower level that is near the horizontal axis. The horizontal axis represents time and time increases from the left side of the plot to the right side of the plot. Trace 408 represents the brake pedal operating state.

The fifth plot from the top of FIG. 4 is a plot of an operating state of vehicle friction brakes versus time. The vertical axis represents the operating state of the vehicle's friction brakes and the friction brakes are applied when trace 410 is at a higher level that is near the vertical axis arrow. The friction brakes are not applied when trace 410 is at a lower level that is near the horizontal axis. The horizontal axis represents time and time increases from the left side of the plot to the right side of the plot. Trace 410 represents the vehicle brake operating state.

The sixth plot from the top of FIG. 4 is a plot of a lubricant (e.g., lube) temperature versus time. The vertical axis represents the lube temperature and the lube temperature increases in the direction of the vertical axis arrow. The horizontal axis represents time and time increases from the left side of the plot to the right side of the plot. Trace 412 represents the lube temperature. Threshold 450 (horizontal line 450) represents a threshold lubricant temperature. If lube temperature is below threshold 450, the electric machine may be rotated without propelling the vehicle so that lube may be distributed throughout the electrified axle.

The seventh plot from the top of FIG. 4 is a plot of an electric machine speed versus time. The vertical axis represents the electric machine speed and the electric machine speed increases in the direction of the vertical axis arrow. The electric machine speed is zero when trace 414 is at the level of the horizontal axis. The horizontal axis represents time and time increases from the left side of the plot to the right side of the plot. Trace 414 represents the electric machine speed.

At time t0, the electrified axle activation request is not asserted and the axle mode is neutral. The electrified axle may be shut down in with its gear set in a neutral state where torque from the electric machine is not transferred to the vehicle's wheels. The axle mode request is also neutral and the brake pedal is not applied. The vehicle brakes are not applied and the axle lubricant temperature is below threshold temperature 450. The electric machine speed is zero.

At time t1, the electrified axle activation request is asserted while the axle is in neutral mode. The electrified axle activation request may be asserted via input to a human/machine interface (e.g., pushbutton, touch display, etc.), a proximity signal, or via remote signal. The axle mode request remains neutral and the brake pedal is not applied. The vehicle brakes are now applied and the lubricant temperature remains below threshold 450. The vehicle brakes are applied in response to the electrified axle request being asserted and the lubricant temperature being below threshold 450. The electric machine speed begins to increase in response to the electrified axle activation request being asserted and the lubricant temperature being below threshold 450.

At time t2, the electrified axle activation request remains asserted and the axle mode remains in neutral. The axle mode request is also neutral, but now the brake pedal is applied by a user (not shown). The vehicle brakes remain applied and the axle lube temperature remains below threshold 450. The electric machine speed has leveled off at a predetermined speed.

At time t3, the axle mode request is changed via an operator (not shown), but the axle mode remains in neutral since axle mode changes are prohibited while the electric machine is rotating in response to the axle activation request state and the axle lube temperature being below threshold temperature 450. The axle activation request remains asserted and the vehicle brakes remain applied. The brake pedal is also applied and the electric machine continues to rotate so that lubricant may be distributed within the axle so that the level of lubricant in the axle may be reduced.

At time t4, the electric machine has rotated for a predetermined amount of time so the speed of the electric machine is reduced. The axle activation request remains asserted and the axle mode remains in neutral. The axle mode request remains in a forward gear.

At time t5, electric machine speed is reduced to zero and the brake pedal is applied so the axle mode is permitted to change to the requested axel mode. Thus, the axle mode switches from neutral to forward (e.g., drive) and a dog clutch engages a forward gear (not shown). The axle activation request remains asserted and the vehicle brakes remain applied. The lube temperature has increased a small amount.

Between time t5 and time t6, a break in time occurs and the values in each plot change after the break in time before time t6. In particular, the axle activation request is not asserted. The axle mode is neutral and the axle mode request is neutral. The brake pedal is not applied and the vehicle brakes are not applied. The axle lubricant temperature is above threshold temperature 450 and the electric machine speed is zero.

At time t6, the electrified axle activation request is asserted while the axle is in neutral mode. The axle mode request remains neutral and the brake pedal is not applied. The vehicle brakes are not applied and the lubricant temperature remains above threshold 450. The vehicle brakes are not applied since the electric machine is not commanded to rotate in response to the lube temperature. The vehicle brake pedal is not applied and the electric machine speed is zero.

At time t7, axle activation request remains asserted and the operator (not shown) changes the axle mode request to forward. The axle mode is changed to follow the axle mode request and the brake pedal is applied while the axle mode is changing state. The vehicle brakes are applied while the brake pedal is applied. The lube temperature remains above threshold 450. The electric machine is not rotating. Shortly after time t7, the electric machine speed begins to increase in response to an increasing driver demand torque (not shown).

In this way, an electric machine may be rotated when lubricant temperature is low and in response to an axle activation request being asserted. However, when axle lubricant temperature is higher and the axle activation request is asserted, the electric machine may not be rotated to distribute lubricant throughout the electrified axle.

Figure 5:
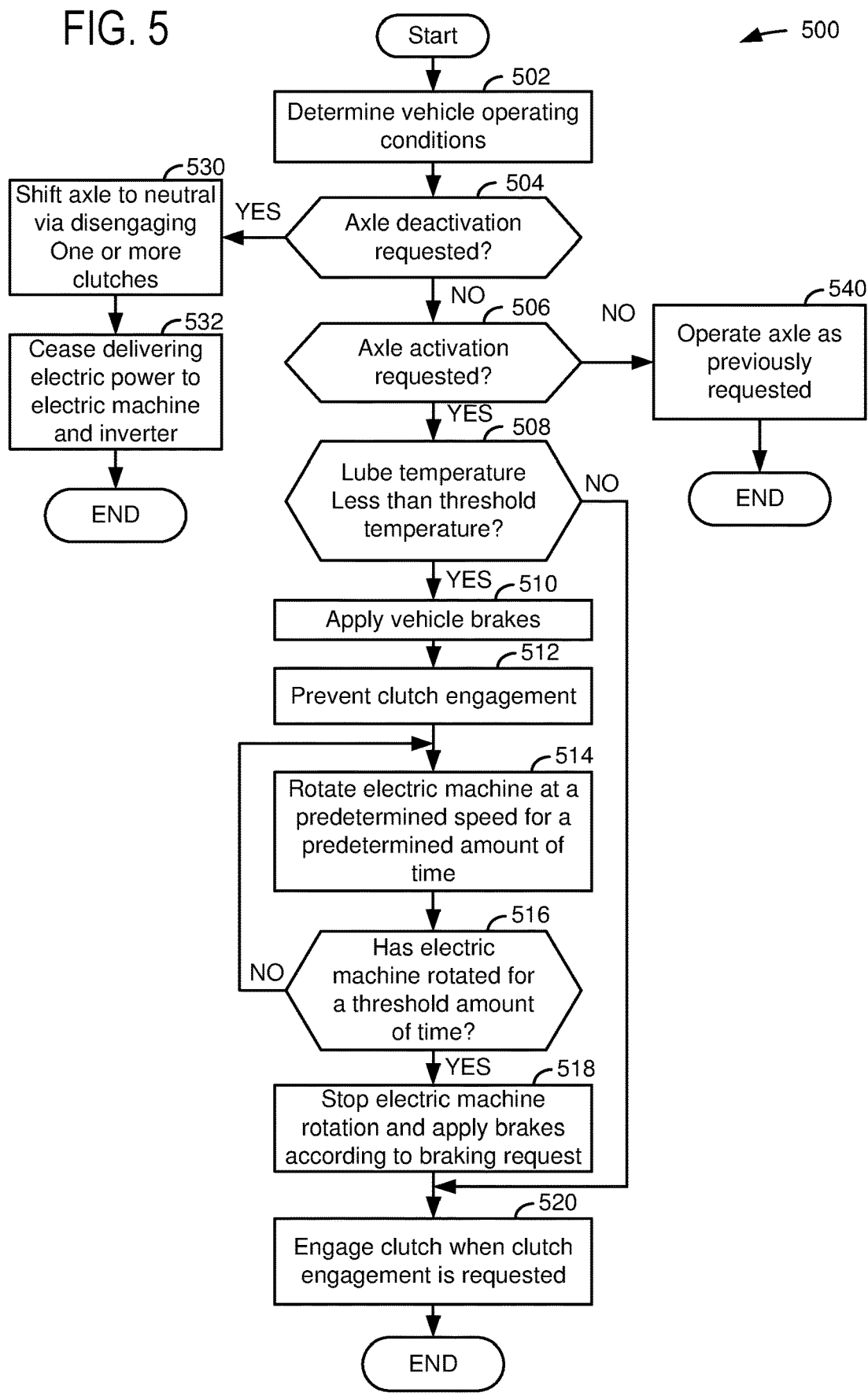
FIG. 5 shows a method for operating an electrified axle.

Referring now to FIG. 5, a method for operating a vehicle is shown. The method may be at least partially implemented as executable instructions stored in controller memory in the system of FIGS. 1-3. Further, the method may include actions taken in the physical world to transform an operating state of the system of FIGS. 1-3. Additionally, the method may provide the operating sequence shown in FIG. 4.

At 502, method 500 determines vehicle operating conditions. Vehicle operating conditions may be determined via the various sensors described herein or the vehicle operating conditions may be inferred. In one example, the operating conditions may include but are not limited to transmission lubricant temperature, vehicle speed, electric machine speed, driver demand torque or power, and ambient temperature. Method 500 proceed to 504.

At 504, method 500 judges if electrified axle deactivation is requested. Electrified axle deactivation may be requested via operator input to a human/machine interface, via a remote device, or in response to vehicle operating conditions (e.g., driver demand torque, vehicle speed, etc.). If method 500 judges that electrified axle deactivation is requested, the answer is yes and method 500 proceeds to 530. Otherwise, the answer is no and method 500 proceeds to 506.

At 530, method 500 shifts the axle to a neutral state (e.g., none of the axles dog clutches are engaged). In addition, if the requested axle mode is park, method 500 may engage a parking pawl to reduce a possibility of vehicle movement. Method 500 proceeds to 532.

At 532, method 500 ceases delivering electric power to the electric machine and/or the inverter that supplies electric power to the electric machine. Thus, the electrified axle is deactivated. Method 500 proceeds to exit.

At 506, method 500 judges whether or not electrified axle activation is requested. Electrified axle activation may be requested via operator input to a human/machine interface, via a remote device, or in response to vehicle operating conditions (e.g., driver demand torque, vehicle speed, etc.). If method 500 judges that electrified axle activation is requested, the answer is yes and method 500 proceeds to 508. Otherwise, the answer is no and method 500 proceeds to 540.

At 540, method 500 operates the electrified axle as previously commanded. For example, if the electrified axle has been commanded to propel a vehicle via delivering an amount of power or torque that is based on a driver demand torque or power, the electrified axle generates the requested amount of power or torque and propels the vehicle. If the electrified axle has been commanded off, the electrified axle does not deliver torque or power to the vehicle's wheels. Method 500 proceeds to exit.

At 510, method 500 optionally applies the vehicle's friction brakes. The vehicle's friction brakes may be automatically applied via the vehicle controller or the axle controller sending a brake command to the braking controller. The friction brakes are applied to reduce a possibility of the vehicle moving while the electrified axle is being cold started. Method 500 proceeds to 512.

At 512, method 500 prevents or inhibits engagement of gear set clutches (e.g., 255 and 355) via preventing the first clutch actuator 112 from moving the shifting fork 206 from moving out of a neutral position where the dog clutches are not engaged. By inhibiting engagement of the dog clutches, the possibility of the vehicle moving may be reduced and the possibility of degradation of the dog clutches may be reduced. Method 500 proceeds to 514.

At 514, method 500 begins rotating the electric machine (e.g., 105) at a predetermined speed (e.g., 200 RPM) for a predetermined amount of time (e.g., 30 seconds). In one example, the predetermined speed and the predetermined amount of time may be empirically determined via measuring a level of lubricant in the electrified axle after rotating the axle at different speeds (e.g., 100 RPM, 200 RPM, 500 RPM, etc.) and observing how much time it takes for the lubricant level to be reduced to a desired level where the first clutch actuator 112 may engage the first or second dog clutch. Rotating the electric machine causes one or more gears that are at least partially submerged in lubricant to distribute the lubricant throughout the electrified axle. The gears that rotate are in a neutral state such that power and torque from the electric machine is not transferred to the vehicle's wheels. Method 500 proceeds to 516.

At 516, method 500 judges whether or not the electric machine has rotated for the threshold amount of time. If so, the answer is yes and method 500 proceeds to 518. Otherwise, the answer is no and method 500 returns to 514.

At 518, method 500 stops rotation of the electric machine and applies the vehicle's friction brakes according to a braking request that may be based on brake pedal position. For example, if the vehicle's brake pedal is applied, the friction brakes are applied. If the brake pedal is not applied, the friction brakes are not applied. Method 500 proceeds to 520.

At 520, method 500 engages clutches (e.g., 255 or 355) of the electrified axle 190 according to clutch engagement requests. For example, if the transmission is requested to be engaged in a forward gear (e.g. a forward axle mode), method 500 engages the clutch that is requested to be engaged to engage a requested gear in response to the transmission being requested to be in a forward mode. Thus, first dog clutch 255 or second dog clutch 355 may be engaged. Method 500 proceeds to exit.

In this way, an electrified axle may be operated so that it may be reliably shifted into gear during cold start conditions. Thus, one of the first dog clutch 255 and the second dog clutch 355 may be engaged after an axle activation request and after a level of lubricant in the axle at the location of the first dog clutch has been reduced as compared to the level of the lubricant immediately before the axle activation request is asserted. However, the first dog clutch 255 and the second dog clutch 355 are prevented or inhibited from engaging from the time of the axle activation request to a time that the electric machine ceases rotating after the electric machine rotated after the axle activation request. If the electrified axle is requested to be started or activated during conditions other than cold conditions, the electric machine need not be rotated before one of the first dog clutch 255 and the second dog clutch 355 is engaged.

Thus, the method of FIG. 5 provides for a method for operating a vehicle, comprising: rotating an electric machine of an axle via a controller while not permitting engagement of a clutch of the axle in response to a request to activate the axle and a temperature of a lubricant being less than a threshold temperature. In a first example, the method includes wherein the electric machine is fastened to the axle, and wherein rotating the electric machine includes rotating the electric machine at a predetermined speed. In a second example that may include the first example, the method includes wherein the rotating the electric machine includes rotating the electric machine for a predetermined amount of time. In a third example that may include one or both of the first and second examples, the method further comprises rotating one or more gears that are at least partially submerged in a transmission lubricant via rotating the electric machine. In a fourth example that may include one or more of the first through third examples, the method further comprises applying vehicle brakes while rotating the electric machine. In a fifth example that may include one or more of the first through fourth examples, the method includes wherein rotating the electric machine includes rotating one or more gears of a gear set while the gear set is in a neutral state. In a sixth example that may include one or more of the first through fifth examples, the method further comprises preventing engagement of a gear while rotating the electric machine.

Method 500 also provides for a method for operating a vehicle, comprising: rotating an electric machine of an axle via a controller in response to a request to activate the axle and a temperature of a lubricant being less than a threshold temperature. In a first example, the method includes wherein the request to activate the axle is based on operator input to a human/machine interface. In a second example that may include the first example, the method includes wherein the electric machine rotates one or more gears of a gear set while the gear set is in a neutral state. In a third example that may include one or more of the first and second examples, the method includes where the neutral state includes where one or more dog clutches are disengaged. In a fourth example that may include one or more of the first through third examples, the method further comprises ceasing to rotate the electric machine after rotating the electric machine for a predetermined amount of time.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an axle including a set of gears and an electric machine; and
a controller including instructions stored in non-transitory memory that when executed cause the controller to rotate the electric machine for a predetermined amount of time in response to a request to cold start the axle and a temperature being less than a threshold temperature.

2. The vehicle system of claim 1, further comprising a lubricant within the axle, and where the temperature is a temperature of the lubricant.

3. The vehicle system of claim 1, wherein cold starting the axle includes activating the electric machine from a deactivated state.

4. The vehicle system of claim 1, further comprising additional instructions that cause the controller to inhibit shifting of the set of gears while the electric machine is rotating for the predetermined amount of time.

5. The vehicle system of claim 1, wherein the electric machine is rotated at a predetermined speed.

6. The vehicle system of claim 1, further comprising additional instructions that cause the controller to stop rotation of the electric machine after rotating the electric machine for the predetermined amount of time.

7. The vehicle system of claim 1, further comprising additional instructions that cause the controller to shift the set of gears to a neutral state in response to a request to shut down the axle.

8. The vehicle system of claim 1, further comprising one or more shift actuators and one or more dog clutches.

9. A method for operating a vehicle, comprising:
rotating an electric machine of an axle via a controller while not permitting engagement of a clutch of the axle in response to a request to activate the axle and a temperature of a lubricant being less than a threshold temperature.

10. The method of claim 9, wherein the electric machine is fastened to the axle, and wherein rotating the electric machine includes rotating the electric machine at a predetermined speed.

11. The method of claim 9, wherein the rotating the electric machine includes rotating the electric machine for a predetermined amount of time.

12. The method of claim 9, further comprising rotating one or more gears that are at least partially submerged in a transmission lubricant via rotating the electric machine.

13. The method of claim 9, further comprising applying vehicle brakes while rotating the electric machine.

14. The method of claim 9, wherein rotating the electric machine includes rotating one or more gears of a gear set while the gear set is in a neutral state.

15. The method of claim 9, further comprising preventing engagement of a gear while rotating the electric machine.

16. A method for operating a vehicle, comprising:
rotating an electric machine of an axle via a controller in response to a request to activate the axle and a temperature of a lubricant being less than a threshold temperature, wherein the request to activate the axle is based on operator input to a human/machine interface, and wherein the electric machine rotates one or more gears of a gear set while the gear set is in a neutral state.

17. The method of claim 16, where the neutral state includes where one or more dog clutches are disengaged.

18. The method of claim 17, further comprising ceasing to rotate the electric machine after rotating the electric machine for a predetermined amount of time.

* * * * *